United States Patent [19]
Fitterer et al.

[11] 3,942,744
[45] Mar. 9, 1976

[54] MAGNETIC TAPE CARTRIDGE

[75] Inventors: Horst Fitterer, Heidelberg-Hasenleiser; Uwe Woweries, Bad Durkheim; Gustav Loewenberg, Ludwigshafen; Dieter Gaiser, Diersheim, all of Germany

[73] Assignee: BASF Aktiengesellschaft, Ludwigshafen (Rhine), Germany

[22] Filed: Oct. 19, 1973

[21] Appl. No.: 407,887

[30] Foreign Application Priority Data
Oct. 21, 1972 Germany............................ 2251746

[52] U.S. Cl. ............... 242/199; 242/75.4; 242/84.8
[51] Int. Cl.² G03B 1/04; G11B 15/32; G11B 23/04
[58] Field of Search .......... 242/199, 200, 198, 71.2, 242/76, 75.4, 84.8

[56] References Cited
UNITED STATES PATENTS

| | | | |
|---|---|---|---|
| 3,556,433 | 1/1971 | Abitboul............................ | 242/199 |
| 3,565,367 | 2/1971 | Yamamoto .......................... | 242/199 |
| 3,712,559 | 1/1973 | Schwartz............................. | 242/199 |
| 3,804,351 | 4/1974 | Kaneko et al....................... | 242/199 |

*Primary Examiner*—Leonard D. Christian
*Attorney, Agent, or Firm*—Johnston, Keil, Thompson & Shurtleff

[57] ABSTRACT

The invention relates to magnetic tape cartridges in general in which between the tape packs and the upper and lower cartridge walls liners are provided which have regions that resiliently guide the tape packs and/or the magnetic tape. By means of specifically shaped regions of the liners, guide channels for the outer turns of the tape pack and/or for the winding or unwinding magnetic tape are formed according to the invention. By virtue of particular spatial arrangements of these guide channels, slipping and folding of the turns of tape already wound is avoided and the magnetic tape is maintained in the correct position as it leaves and joins the packs, irrespective of the type of bearing means used for the tape winding reels and irrespective of the shape of the tape packs, so that disturbances in operation are avoided and the tape is correctly positioned relative to the scanning means. Cartridges according to the invention may be employed advantageously in the recording and reproduction of audio and other signals.

14 Claims, 16 Drawing Figures

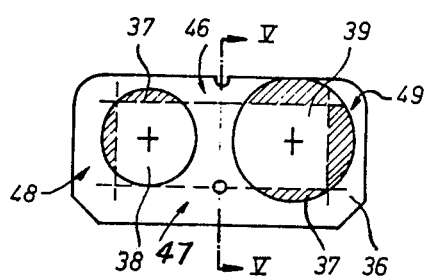
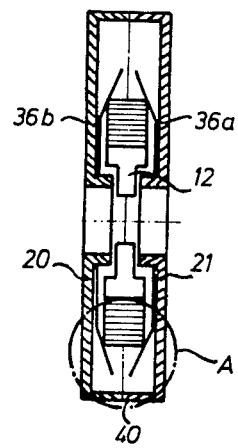
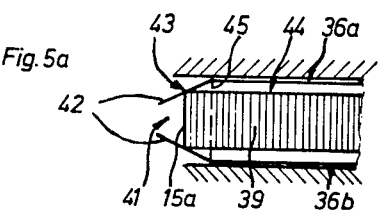
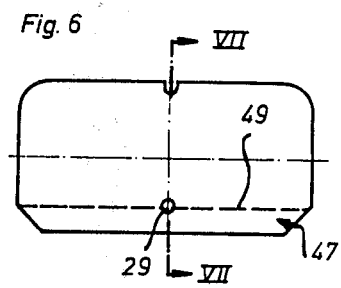
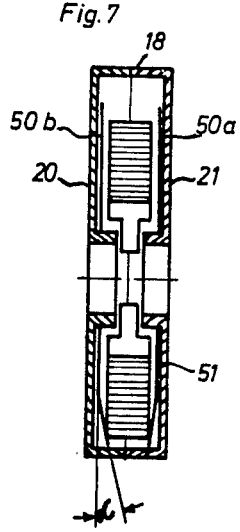
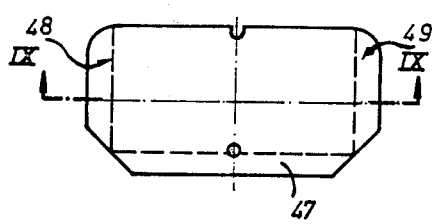

MAGNETIC TAPE CARTRIDGE

The present invention relates to a magnetic tape cartridge, especially a compact cassette, with at least one tape winding hub onto which, and/or from which, the magnetic tape is wound or unwound, liners being arranged between the reel of magnetic tape and the upper and lower walls of the cartridge, each of the liners being provided with at least one portion which resiliently guides the pack.

In German Published application No. 1,962,628, for example, liners with curved portions are disclosed for magnetic tape cartridges with juxtaposed reels, which curved portions are resiliently urged against the tape packs such that they bear against their horizontal surfaces. The liners are also intended to bear on the outer zones of the packs located at either end of the cartridge and on the upper and lower edges of magnetic tape which is being wound or unwound. Almost without exception, all these types of liner are provided, in the longitudinal direction, with a portion convexly curved toward the pack surfaces. As a result, pressure is applied to the hubs, the inner turns of the pack, the outer turns of the pack and the edges of the winding or unwinding magnetic tape within a comparatively narrow rectangular region above and below the pack, so that the tape winding operation is rendered more uniform. However, these known types of liner cannot prevent "slipping" of the outer turns of the pack and/or "seizure" of the pack between the upper and lower cartridge walls with any degree of safety.

The term "slipping," as used in this context and later on in the description, refers to the following hazard: one or more turns of magnetic tape at the periphery of the pack slide up or down and, during further winding, slip into the space between the pack and the upper or lower cartridge wall, so that the tape jams between the pack and the upper or lower wall. A tape which has jammed in this way can no longer be transported. Visible symptoms of such jamming are tape escaping from the openings in the front wall of the cartridge, tape coiling itself around the capstan of the playback apparatus and, eventually, cartridge stoppage, with complete immobility of the tape and the tape pack.

The term "seizure" refers to the following hazard: the frictional torque of the tape pack increases to such an extent during the tape winding operation that it becomes greater than the torque of the drive shaft; in this condition, the pack stops and the tape ceases to be wound. This frictional torque builds up when the pack is unevenly wound in the cartridge and eventually begins to rub against the upper and lower walls. A pack is said to be wound unevenly when its shape deviates from that of a disc, i.e. for example when individual layers of tape protrude from the pack or when the pack assumes a saucer or ridged shape.

A seized cartridge develops the same kind of trouble as that described above in connection with "slipping."

In German Petty Pat. No. 7,116,933, another liner is disclosed which has parallel linear embossed projections extending in a longitudinal direction. In addition, longitudinal peripheral strips of the liner are bent toward the associated upper and lower cartridge walls, so that the liners are supported on the inner walls of the housing. This liner has much the same properties as the above-described liner; it is not an effective remedy against slipping or seizure.

In German Petty Pat. No. 1,996,273, a liner is disclosed which is provided with radial crimpings adjacent to the tape pack surfaces. In the longitudinal direction of the cartridge these crimpings are likewise arranged in the central region of the pack surfaces, so that the packs are centered in the plane of rotation a little more effectively. On the other hand, slipping or seizure is only countered by extremely narrow resilient embossed projections which cannot perform this function adequately.

A magnetic tape cartridge is known which is provided with liners with a fold along the center line of the cartridge, the fold pointing toward the associated upper or lower wall, so that the lateral portions of the liner cover the tape pack like a gently sloping roof and extend at angle of about 5° relative to the associated lower or upper wall. Apart from having, at most, a slight centering effect on the tape pack in the plane of rotation, this arrangement can scarcely prevent slipping or seizure because the liner exerts little or no pressure on the peripheral zone of the tape pack.

According to the German Petty Pat. No. 7,124,132, the outer turns of the tape pack are prevented from slipping from the pack by means of a leaf spring bearing on the pack. The effective force of this leaf spring must be extremely low and must be within very narrow limits of tolerance in order to ensure the application of a specified braking force to the pack. This is difficult to achieve in manufacture. Moreover, such a leaf spring constitutes an additional element in the cartridge and therefore makes the cartridge more expensive to manufacture.

An object of the invention is to provide an improved magnetic tape cartridge in which slipping of the tape and/or seizure of the tape pack or packs is prevented by special liner designs.

According to the invention, this object is achieved by a magnetic tape cartridge of the type referred to, wherein at least one guide channel for the outer turns of the tape pack and/or for the winding or unwinding magnetic tape is formed by liners, which channel is delimited on one side by the tape pack itself.

In this way tape travel and winding in cartridges is considerably improved under all operating conditions. Above all, cartridge life is prolonged and the quality of the recorded or reproduced signals is enhanced. These advantages are the result, in particular, of extremely uniform and trouble-free winding and unwinding of the magnetic type which makes for more consistent tape pace and improved tape/head contact. A special advantage of the invention is that, by mere modification of the liner shape, additional means for preventing the tape from slipping from the pack (e.g. the above-mentioned tape pack brake spring and/or special tape guide means which prevent the tape from jamming, such as are disclosed, for example, in German Petty Pat. No. 7,111,932) can be dispensed with. On the other hand, a combination of these conventional means with the liners of the present invention could be of advantage.

Last but not least, the invention reduces the manufacturing costs of magnetic tape cartridges. In particular, magnetic tape cartridges, and especially compact cassettes, become more attractive for the user, owing to the present invention.

In an advantageous embodiment of the invention, the guide channel is formed by curved or, preferably, sharply bent-over peripheral liner portions which are substantially congruent with each other and whose planes form an angle with the planes of the liner portions bearing on the upper and lower cartridge walls and extend toward the central plane of the cartridge. In this way, a guide channel is formed between the peripheral liner portions projecting beyond the periphery of the tape pack and the tape pack itself, so that the spring force acting upon the outer turns of the tape pack and on the winding or unwinding magnetic tape can be readily set up by appropriate choice of the liner material, its thickness and flexibility and the selection of a suitable angle. Besides, these curvatures or folds can be produced very easily and assembly of the cartridge is not rendered more difficult than in the case of conventional magnetic tape cartridges.

In a preferred embodiment of the invention, the peripheral liner portions forming the guide channel or channels are bent substantially symmetrically with respect to the central plane of the cartridge. As a result, substantially identical forces act upon the turns of the tape pack or on the winding or unwinding magnetic tape on either side, so that the same advantageous tape winding and running properties are achieved in both operating positions of reversible cartridge types. For non-reversible cartridges, which are used only on one side and employed, for example, for data recording, it is also possible to use liners which are asymmetrical relative to the central plane of the cartridge.

According to another advantageous arrangement of the invention, several guide channels extend parallel and/or at right angles to the front wall of the cartridge and symmetrically with respect to at least one center line of the tape pack or packs. In this way, either slipping or seizure or both are prevented merely by a suitable arrangement of the guide channels.

Further according to the invention, a guide channel may be situated asymmetrically with respect to a center line of the tape pack or packs substantially parallel with the front wall of the cartridge, and especially asymmetrically with respect to the longitudinal central axis of the cartridge.

With such an arrangement it is simple to counter tape slip in those regions of the tape pack or packs which are liable to develop this kind of trouble.

In a further advantageous embodiment of the invention, one or more guide channels may be formed by peripheral liner portions bent along lines between the tape pack peripheries determined by half the pack radius and the maximum pack radius. In this way it is possible to prevent slipping and folding of the tape especially in the case of large tape packs whose outer turns are relatively long.

In yet another advantageous embodiment of the invention, seizure is prevented and guidance of the winding or unwinding tape improved by one or more guide channels which are formed by peripheral liner portions bent along lines situated between the periphery of the winding hub and the periphery of the tape pack at maximum diameter. This prevents tape layers from protruding from the pack in its outer regions, which might cause seizure. The improved guidance brought about by the liners also makes for a uniform flat pack and, on the side of the unwinding magnetic tape, improves the alignment of the tape relative to the magnetic head.

The invention offers the further advantage that the guide channel or channels formed by the peripheral liner portions are provided in the region of a tape pack periphery determined by a radius smaller than the maximum radius. As a result, the guide channels are always bound to become most effective in the critical region of the tape pack periphery. In cartridges with two juxtaposed tape packs, for example, this has the advantage that the braking force applied to the larger tape pack is greater than that applied to the smaller pack while the total drive torque remains unchanged.

In an advantageous, inexpensive embodiment of the invention, the guide channels are formed by two liners with a central curvature concave to the central plane of the cartridge.

In a further advantageous embodiment of the invention, one guide channel is arranged close to, and parallel with, the rear wall of the cartridge. This arrangement counters slipping and folding of the outer turns of the magnetic tape pack at critical points on the pack or packs, so that the likelihood of seizure is considerably lessened. Moreover, a guide channel arranged in this way can easily be combined with known movable tape guide elements.

In yet another advantageous embodiment of the invention, a guide channel is arranged on the side of the tape pack or packs which the tape joins or leaves.

Although a tape guide associated with the take-up pack is more important, especially as a safeguard against seizure, it has been found that effective tape guiding means on the unwinding side also contribute to trouble-free tape travel in the cartridge and relative to the magnetic head.

A safeguard against slipping as well as seizure is provided by the invention in that a guide channel extends along a quadrant of the tape pack circumference nearest the rear wall of the cartridge and that side of the tape pack which the tape joins or leaves.

In an embodiment of the invention combining various features, a guide channel extends adjacent to the rear wall of the cartridge, and a further guide channel is arranged on the side of each tape pack which the tape joins and leves. This arrangement is of particular advantage for cartridges with juxtaposed tape winding hubs, such as compact cassettes, and makes further special tape guiding means superfluous.

In a highly effective embodiment of the invention, a guide channel extends around the tape pack periphery, an inlet and an outlet for the winding and unwinding tape being provided. This prevents the outer turns of the tape pack from slipping at almost every point on the tape pack periphery and, at the same time, improves tape guidance and prevents seizure.

Further details of the invention are disclosed in the following description of various embodiments thereof illustrated in the accompanying drawings, in which FIG. 1 is a diagrammatic plan view of a transparent compact cassette;

FIG. 4 is the plan view of a liner;

FIG. 5 is a cross-sectional view (along the lines V—V) of a cassette with liners reversed relative to FIG. 2;

FIG. 5a is a detail of the cassette cross-section according to FIG. 5;

FIG. 6 is a plan view of a liner with a bent longitudinal edge;

FIG. 7 is a cross-sectional view (along lines VII—VII) of a cassette with liners according to FIG. 6;

FIG. 8 is a plan view of a liner according to FIG. 6 with additionally bent lateral edges;

FIG. 9 is a longitudinal section (along lines IX—IX) of a cassette with liners according to FIG. 8;

Figure 1:
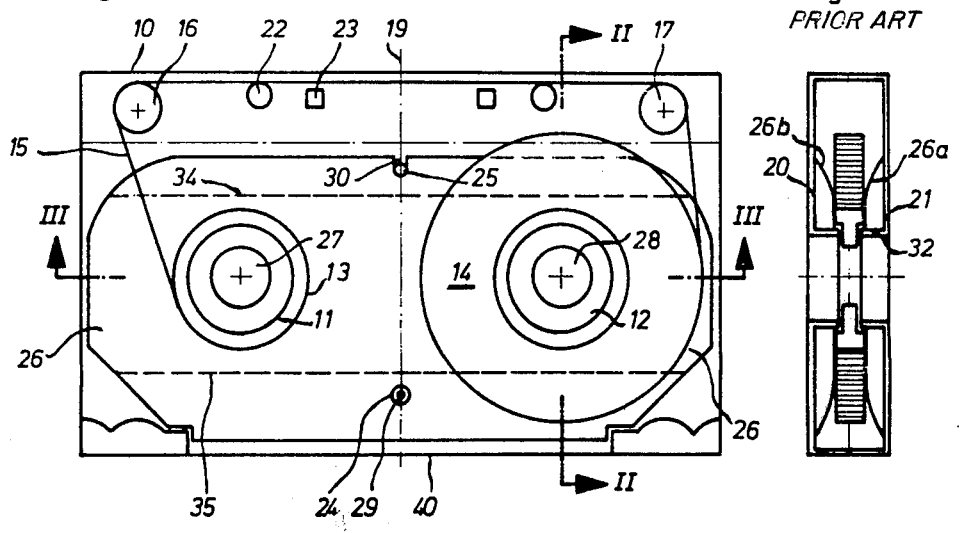

A compact cassette 10 contains magnetic tape 15 wound on two juxtaposed hubs 11 and 12 to form tape packs 13 and 14. Between the tape packs 13 and 14 the magnetic tape 15 runs over idler rolls 16 and 17, so that it is guided parallel to the front wall 18 of the cassette. In the front wall 18 there are provided apertures, not shown here, through which magnetic heads on the recorder and, possibly, tape pressure rollers can enter the cassette. Symmetrically with respect to the transverse central axis 19 of the cassette 10, apertures 22 and 23 are provided in the lower and upper walls 20 and 21 through which capstans and/or tape guide pins on the recorder pass. In the plane of the transverse central axis 19, pins 24 and 25 are molded integrally with the lower and upper walls 20 and 21, which pins serve to secure the liners 26. The liners 26 are provided with circular apertures 27 and 28 above the openings in the hubs 11 and 12. The liners 26 are substantially rectangular, with chamfered corners, thus being adapted to the inner space of cassette 10. For the pins 24 and 25 a small circular aperture 29 and a cut-out 30 are provided in each of the two liners 26. Provision of these fastening means and conformation of the shape of the liners to the cassette space ensure that the liners 26, after insertion, retain their correct position in the cassette part with which they are associated.

Figure 2:
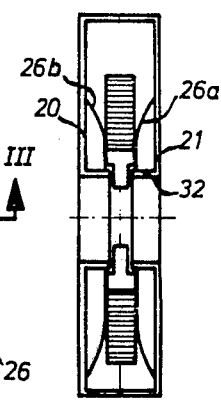
FIG. 2 is a cross-sectional view of the cassette along the lines II—II of FIG. 1, showing conventionally shaped liners.

FIG. 2 shows a cross-section on lines II—II of a compact cassette 10 with conventional Teflon liners. It can be seen that each of the liners (26a and 26b) bears with its longitudinal edges on the lower and upper walls, 20 and 21 respectively, and surrounds with its apertures 27 and 28 the annular flanges 31 and 32 on the lower and upper walls 20 and 21 of the cassette 10. In FIG. 2, there can be seen a slightly curved cross-sectional outline of each liner 26a and 26b which extends from its longitudinal outer edges to the annular flanges 31 and 32.

As has already been mentioned, the conventional liners are intended to exert pressure on the central region of the tape pack. As can be seen in the sectional views of FIGS. 2 and 3, there is achieved mainly by the curvature of the liner extending in the longitudinal direction. The width and the length of this curvature are indicated in FIG. 1 by the dotted lines 34 and 35.

Figure 3:
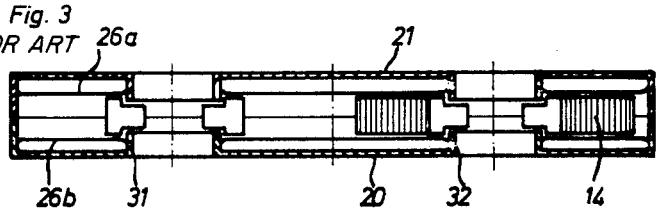
FIG. 3 is a longitudinal section along the lines III—III of FIG. 1, likewise showing conventionally shaped liners.

Apart from these dotted lines 34 and 35, FIG. 1 could be a view of any compact cassette containing liners. FIGS. 2 and 3, on the other hand, represent the present state of the art in respect of liner shapes in any type of magnetic tape cartridge.

A first novel liner arrangement is shown in FIG. 5. In this cassette 10, Teflon liners 36a and b have been inserted in a position reversed relative to that of FIG. 2. Here, the curved liner portions bear against the lower and upper walls 20 and 21 of the cassette, and the edge portions of the liners on both sides bear on the periphery of the tape pack. Therefore, the liners 36a and 36b, due to their resilience, become most effective where their action is most needed in a magnetic tape cassette, i.e. at the tape pack periphery, especially in the case of large pack diameters. The hatched regions 37 in FIG. 4 indicate where the tape pack 38 and 39 make contact with the liners 36a and b or, in other words, where a force is applied to the tape packs 38 and 39. It is clearly apparent that a greater force is applied to tape pack 39 than to pack 38 and that pack 39 is therefore retarded to a greater extent than pack 38. The hatched areas on the tape pack 39 show that the applied forces become effective near the rear wall 40 of the cassette, the cassette front wall 18 and also on the side where the tape joins and leaves the tape pack. When comparing this arrangement with that of FIG. 2, the following observations can be made: in FIG. 2 the liners 26a and 26b exert substantially equal pressure on the two tape packs 13 and 14 because both tape packs are continuously situated within the region of the curvature limits 34 and 35. In the embodiment of FIGS. 4 to 5a, a relatively large pressure is exerted on pack 39 by the liners 36a and 36b, whereas less pressure is exerted on pack 38. By virtue of this difference, slipping is avoided in the critical region, i.e. in the region where the outer turns of the tape pack are at their longest, because the larger the pack diameter, the greater the risk of slipping. This effect is achieved especially by the liner pressure exerted near the cassette rear wall 40 which ensures that the outer turns in this region are retained and guided to a higher degree and are therefore prevented from slipping. At the same time, the frictional torque applied to the tape pack 39 is greater than that applied to a tape pack of equal size in cassettes with liners according to FIG. 1. However, this apparent disadvantage can be disregarded - in terms of the overall frictional torque - since the frictional torque applied to the tape pack 38 is much smaller than in the case of a cassette such as shown in FIG. 1, for example. Also the guiding effect of the liners 36a and b on the winding or unwinding tape of the pack 38 is much smaller than the effect on the pack 39. If the pack 39 operates as take-up pack, the lateral peripheral regions of the liners 36a and 36b also improve winding and unwinding of the magnetic tape, the result being a uniform flat tape pack. This constitutes a remedy against seizure. In this way, trouble caused by slipping and/or seizure especially during recording, playback and fast winding, for example in the case of sudden stops, starts or drive reversal, can be eliminated, even when extremely thin magnetic tapes of 10 $\mu$ or less are used.

If the tape pack 38 of FIG. 4 is the take-up pack, the hatched regions 37 associated with it increase in size as the pack diameter increases, so that the liner exerts increasingly greater pressure on the pack 38, whereas the frictional torque applied to the pack 39 decreases simultaneously.

The detail A of FIG. 5 is shown enlarged in FIG. 5a, illustrating the guide channel 41. At the upper and lower edge of its periphery the tape pack 39 makes contact with curved or sharply bent-over peripheral portions 42 of liners 36a and b whose cross-sectional outlines form a partly open triangle with the tape pack and, in spatial terms, a guide channel 41. The cross-sectional outline may also be approximately circular or parabolic or any other suitable shape. Within the channel 41 there is an individual tape layer 15a which may be a turn just detaching itself from the periphery of the pack or a tape portion just joining or leaving the tape pack.

It is clear that the peripheral portions 42 of the liner lift and support the magnetic tape 15 at its lower and upper edges merely as a result of the shape of the guide channel 41, this being of particular importance in view of the play at the bearings for the hubs in compact cassettes. Furthermore, the tape 15 is urged back toward the pack by the inclined walls of the channel 41 if it has detached itself therefrom. Furthermore, the tape 15 is prevented from folding at the points 43 where the peripheral portions 42 contact the peripheral edges of the tape pack and from completely sliding past these points and slipping below one of the tape pack surfaces 44 - a fault which must eventually lead to seizure of the pack. Apart from the shape of the guide channel 41, the pressure exerted by the peripheral regions 42 is another decisive factor which prevents slipping. The known Teflon liners designated 36a and 36b respectively are flexible; therefore, the fold lines 45 should be advantageously situated closely adjacent to the periphery of the tape pack 39, so that these peripheral regions 42 can exert sufficient pressure on the magnetic tape 15. More resilient liners should be bent at a proportionately smaller angle, so that the fold lines 45 - given the same position of the guide channel 41 - become further removed toward the hub, if it is desired to exert the same pressure. The cross-sectional outline of the guide channel 41 or, in three-dimensional terms, the bent-over peripheral regions 42, in addition to having the effects already described, also damps wobbling of the tape pack, i.e. the tape pack is maintained essentially in a central plane. This effect, in conjunction with the guidance provided by the channel 41 for the winding or unwinding magnetic tape, prevents seizure of the tape pack. In the case of the other channels to be described below, which may also be arranged on those sides of the tape pack which the magnetic tape joins or leaves, the same effects as those already described in connection with channel 41 are produced by the liners.

The following regions in FIG. 4 are considered to be guide channels for the purposes of the present invention: the first guide channels 46 and 47 are situated near the front wall 18 and the rear wall 40 respectively of the cassette at the tape pack 39 (their delimination being indicated by dotted lines) and extend in a longitudinal direction past the pack 38. Channel 46 extends approximately from the dotted line to the rear edge of the liner. The second category of guide channels 48 and 49 extend laterally along the outsides of tape packs 38 and 39.

In view of the above-described effects of liners 36a and 36b it is necessary to optimally adjust the effective pressure exerted by them also in relation to the tape pack diameter. Practical experiments have revealed that guide channel 47, which is particularly important as a safeguard against slipping, should be situated between half the tape pack diameter and the maximum tape pack diameter. More particularly, this guide channel may be arranged in a region approximately coincident with two thirds or three quarters of the maximum diameter.

The guide channels 48 and 49 for the unwinding or winding magnetic tape, which constitute a particularly effective safeguard against seizure, may be arranged in a suitable position between the hub periphery and the periphery of the pack at maximum diameter.

The above-described liners may be made of Teflon, i.e. conventional polytetrafluoroethylene sheets having a thickness of approximately 20 to 100 $\mu$. These liners are very soft and flexible. However, the above-described liners and the liners still to be described below may also be made of any other suitable material, such as polyethylene, polyvinyl chloride, etc. Furthermore, these liners may be provided with suitable coatings, such as metal or graphite, which prevent the accumulation of static electric charges.

All the liners still to be described should have approximately the same shape and be secured in the cassettes without any additional means mainly be means of pins 24 and 25, etc.

FIG. 6 shows a liner 50 having a fold on a level with aperture 29, indicated by a dotted line 49. The line 49 may also indicate a curve. For the manufacture of such modifications, a hot shaping process is recommended, to ensure the necessary dimensional stability; however, other suitable production methods may be used.

FIG. 7 shows the position of such liners 50a and 50b in a cassette relative to a tape pack. Toward the front wall 18 of the cassette, the liners 50a and 50b extend substantially parallel with the lower and upper cassette walls 20 and 21, so that the winding or unwinding magnetic tape can approach the tape pack or leave it without being obstructed. Pressure is exerted by the peripheral portions of the liner bent, so as to form the guide channel 47, at an angle of approximately 170° (in the case of polyester material 35 $\mu$ thick) relative to the flat portion 51. In other words, the angle $\alpha$ is from about 10° to 20° and largely depends on the type of material. The arrangement of this guide channel 47 constitutes the best possible safeguard against slipping, and liners like 50a and 50b can be employed advantageously in cassettes with additional tape guide levers.

FIG. 8 shows a liner with a similar guide channel 47, likewise formed by a sharply bent-over portion, which communicates at its ends with guide channels 48 and 49, likewise formed by sharply bent-over portions. In FIG. 9, the guide channels 48 and 49 are shown in crosssection. This cassette therefore comprises three guide channels, 47, 48 and 49, each being formed by curved or sharply bent-over portions and the periphery of the tape pack. While the channel 47 serves again mainly to counter slipping, the channels 48 and 49 act mainly as guides for the outer turns of the tape pack as well as the winding or unwinding magnetic tape and in particular prevent seizure.

A region which is particularly critical with regard to slipping extends from the point of intersection of the transverse center line of the tape pack and the tape pack periphery to the point where the winding tape joins, or the unwinding tape leaves, the pack.

Figure 10:
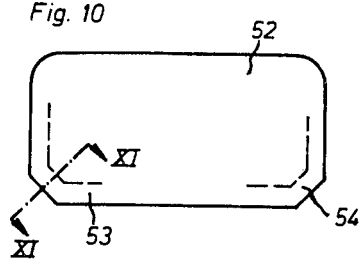
FIG. 10 is a plan view of a liner with quadrantally bent corner edges.
Figure 11:
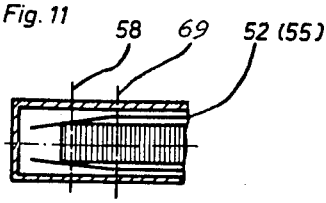
FIG. 11 is a cassette detail with a liner according to FIG. 10 (sectioned along lines XI—XI)
Figure 10A:
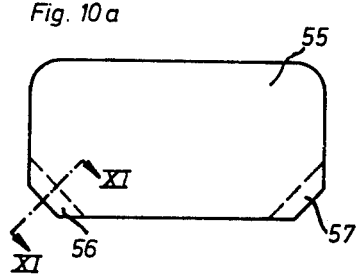
FIG. 10a is a plan view of a liner with straight folds at the corners.

FIG. 10 shows a liner 52 with guide channels 53 and 54, indicated in this region by dotted lines and describing a quadrant about each of the tape packs. FIG. 10a shows a somewhat simplified liner version 55 in which the channels 56 and 57 at the corners are straight. The latter version can be produced simply by folding or bending the liner corners. FIG. 11 shows a cassette section along the line XI—XI, with liners 52 or 55. The fold lines occupy a position defined by the dotted line 69 at a comparatively large distance from the illustrated tape pack periphery, so that the liner edges projecting beyond the periphery of the pack are spaced relatively far apart. This is usually a sign that the full spring force of the liners becomes effective approximately between the dotted lines 69 and 58, so that the guide channel 53 or 56 can be assumed to occupy this region.

Figure 12:
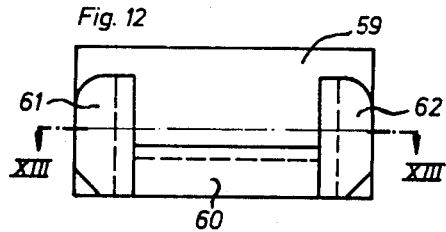
FIG. 12 is a plan view of a cassette with liner portions fastened to the upper and lower cassette walls.

Another embodiment of a cassette 59, with liner sections 60, 61 and 62 fastened, for example, by adhesive to the lower and upper cassette walls 20 and 21, is shown in FIG. 12. Here, the flat liner portions above the tape packs, which have little or no effect, have been omitted. The arrangement of the guide channels 47 to 49 corresponds for example to that shown for the liner in FIG. 8.

Figure 13:
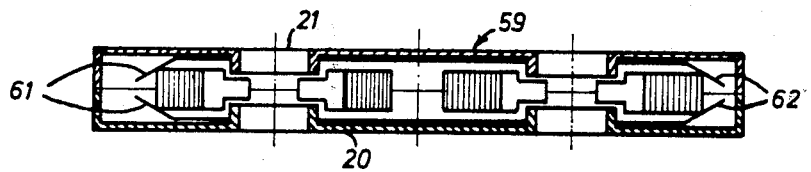
FIG. 13 is a longitudinal section of a cassette (along lines XIII—XIII) with liner portions according to FIG. 12.

Liner sections 61 and 62 may either be used in conjunction with portion 60 or without it. Portion 60 may also be used on its own. FIG. 13 is a longitudinal section of cassette 59 showing the position of the liner sections 61 and 62.

Figure 14:
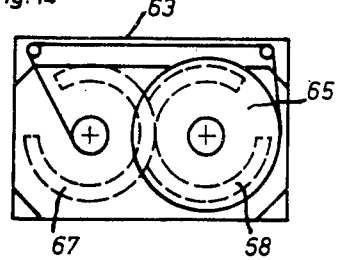
FIG. 14 is a plan view of a cassette with liners having annular embossings.
Figure 15:
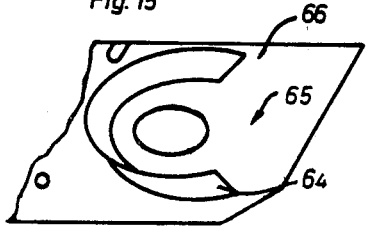
FIG. 15 is a perspective view of a liner section according to FIG. 14.

FIG. 14 shows another advantageous embodiment of a cassette 63 with a liner arrangement in which saucer-shaped embossed projections are provided above and below the tape packs. However, the embossed portion is not completely annular in shape but has a flat section allowing the magnetic tape 15 to approach and leave the pack. FIG. 15 illustrates the saucer-shaped portion of a lower liner 66. The liner 66 may be produced, for example, by embossing a flat sheet. However, it is also possible to merely cut out the embossed portion and glue it to the lower cassette wall 20.

This annular arrangement of the guide channels 67 and 68 makes possible particularly effective centering of the tape packs in the plane of rotation, constitutes an extremely effective safeguard against slipping and seizure, and greatly improves guidance of the tape.

We claim:

1. A magnetic tape cartridge, especially a compact cassette, with at least one tape winding hub onto which the magnetic tape is wound and/or from which it is unwound, at least two liners being provided, one on each side of the reel of wound tape, between the latter and the lower and upper cartridge walls, respectively, said liners comprising portions, at least one for each liner, which resiliently engage the tape pack, wherein said portions are formed to provide between them at least one guide channel for the outer turns of the tape pack and/or for the tape to be wound or unwound, said channel, at its bottom being delimited by the tape pack itself and having legs defined by said liner portions and angling towards each other in a radially outward direction, and said channel extending substantially between the region where the winding or unwinding tape joins or leaves the pack and the region of intersection of the pack periphery with the transverse center line of the pack, whereby the tape is kept from slipping off the pack.

2. A cartridge according to claim 1, in which said liner portions are peripheral bent-over liner portions substantially congruent with one another whose planes form an angle with the planes of the liner parts bearing on the lower and upper cartridge walls and extend in a direction toward the central plane of the cartridge.

3. A cartridge according to claim 1, in which said liner portions extend substantially symmetrically with respect to the central plane of the cartridge.

4. A cartridge according to claim 1, in which said liner portions are formed to provide a plurality of guide channels extending parallel and at right angles to the front wall of the cartridge and symmetrically with respect to at least one center line of the tape pack.

5. A cartridge according to claim 1, in which said liner portions are formed to provide a guide channel extending asymmetrically with respect to the center line of the tape pack corresponding to the longitudinal central axis of the cartridge, and substantially parallel with the front wall of the cartridge.

6. A cartridge according to claim 4, in which said liner portions providing said guide channel extending parallel to the front wall of the cassette are peripheral liner portions bent along lines situated in a range defined by half the pack radius and the maximum pack radius.

7. A cartridge according to claim 4, in which said liner portions providing said guide channel extending at right angles to the front wall of the cassette are peripheral liner portions bent along lines situated between the periphery of the winding hub and the periphery of the tape pack at maximum diameter.

8. A cartridge according to claim 1, in which said liner portions providing one guide channel are peripheral liner portions provided adjacent to a tape pack periphery determined by a radius smaller than the maximum radius.

9. A cartridge according to claim 1, in which said two liners, in their central region, have parts concave relative to the central plane of the cartridge.

10. A cartridge according to claim 8, in which said liner portions are formed to provide a guide channel which runs substantially parallel with the rear wall of the cartridge and is arranged adjacent thereto.

11. A cartridge according to claim 1, in which said liner portions are formed to provide a guide channel on that side of each of a pair of tape packs which the tape joins or leaves.

12. A cartridge according to claim 1, in which said liner portions are formed to provide a guide channel extending along a quadrant of the tape pack circumference nearest the rear wall of the cartridge and that side of the tape pack which the tape joins or leaves.

13. A cartridge according to claim 1, in which said liner portions are formed to provide a guide channel extending generally annularly around the tape pack periphery, except for the provisions of an inlet and an outlet for the winding or unwinding tape.

14. A cartridge according to claim 1, in which said liner portions are formed to provide a guide channel running close to the rear wall of the cartridge and one further guide channel on the side of each tape pack which the tape joins or leaves.

* * * * *